(12) United States Patent
Nagasawa

(10) Patent No.: US 10,583,800 B2
(45) Date of Patent: Mar. 10, 2020

(54) OCCUPANT PROTECTION DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 15/850,373

(22) Filed: Dec. 21, 2017

(65) Prior Publication Data

US 2018/0272984 A1   Sep. 27, 2018

(30) Foreign Application Priority Data

Mar. 27, 2017 (JP) ................................ 2017-060281

(51) Int. Cl.
*B60R 21/16* (2006.01)
*B60R 21/231* (2011.01)

(52) U.S. Cl.
CPC .. *B60R 21/231* (2013.01); *B60R 2021/23169* (2013.01)

(58) Field of Classification Search
CPC ................... B60R 21/231; B60R 2021/23169
USPC ................ 280/730.2, 731, 732, 743.2, 743.1
See application file for complete search history.

(56) References Cited

U.S. PATENT DOCUMENTS

| 7,347,445 | B2* | 3/2008 | Choi | B60R 21/233 |
| | | | | 280/729 |
| 7,661,700 | B2 | 2/2010 | Imamura et al. | |
| 8,590,928 | B2* | 11/2013 | Spahn | B60R 21/23 |
| | | | | 280/729 |
| 8,678,429 | B2 | 3/2014 | Nagasawa et al. | |
| 9,623,831 | B1* | 4/2017 | Deng | B60R 21/239 |
| 10,293,775 | B2* | 5/2019 | Wang | B60R 21/231 |
| 2011/0156378 | A1* | 6/2011 | Matsushima | B60R 21/231 |
| | | | | 280/730.1 |
| 2018/0345895 | A1* | 12/2018 | Farooq | B60R 21/205 |
| 2019/0039551 | A1* | 2/2019 | Patel | B60R 21/206 |
| 2019/0054889 | A1* | 2/2019 | Suemitsu | B60R 21/231 |

FOREIGN PATENT DOCUMENTS

| JP | S49-87019 | 8/1974 |
| JP | 2005-335593 A | 12/2005 |
| JP | 2008-126974 A | 6/2008 |
| JP | 2010-235009 A | 10/2010 |
| JP | 2013-014176 A | 1/2013 |

OTHER PUBLICATIONS

Office Action received in Japanese Patent Application No. 2017-060281 dated Oct. 23, 2018 (2 pages in Japanese with English translation).

* cited by examiner

*Primary Examiner* — Toan C To
(74) *Attorney, Agent, or Firm* — Smith, Gambrell & Russell, LLP

(57) ABSTRACT

An occupant protection device includes a knee air bag. The knee air bag is configured to be deployed rearwardly from a front of right and left knees of an occupant seated in a seat of a vehicle towards the knees to press the knees from the front. The knee air bag includes at least either one of a right side inclined surface and a left side inclined surface. The right side inclined surface is configured to come in contact, from a right side, with the right knee of the occupant seated in the seat and the left side inclined surface is configured to come in contact with the left knee of the occupant from a left side.

20 Claims, 7 Drawing Sheets

OCCUPANT PROTECTION DEVICE

CROSS-REFERENCE TO RELATED APPLICATIONS

The present application claims priority from Japanese Patent Application No. 2017-060281 filed on Mar. 27, 2017, the entire contents of which are hereby incorporated by reference.

BACKGROUND

1. Technical Field

The present disclosure relates to a device that protects an occupant seated in a seat of an automobile.

2. Related Art

There is a device that protects an occupant seated in a seat of an automobile by using a seat belt and a front air bag (Japanese Unexamined Patent Application Publication No. 2010-235009).

The seat belt is typically a three-point seat belt and includes a lap portion around the waist of the occupant sitting in the seat, and a shoulder portion crossed diagonally across the front portion of the upper body. Furthermore, a retractor retracts the seat belt to reduce the slackness of the seat belt before a collision and restricts the seat belt from being sent out during the collision. With the above, the seat belt can be actuated to maintain the body of the occupant, which is about to move to the front from the seat during a collision, in a seated state in the seat.

The front air bag is, in an occupant compartment, provided in a steering wheel or a dashboard provided in front of the seat, and is deployed rearwardly towards the seat. Furthermore, the deployed front air bag supports the upper body of the occupant that is collapsing forward at the time of collision and absorbs the impact.

However, the occupant is not necessarily always protected appropriately against all forms of collision even when such an occupant protection device is used.

For example, in a case of a front collision as well, there is a possibility of the occupant seated in the seat being moved forward by the impact of the collision. Furthermore, when the waist of the occupant slides and moves forward from the sitting position of the seat, the upper body about to collapse forward about the waist, serving as an axis, collapses forward while the upper body is near the front air bag. In such a case, the state in which the front air bag and the upper body come into contact with each other is different from the anticipated state in which the waist is at the sitting position of the seat.

Particularly, in a form of collision in which the vehicle is abruptly stopped by a full-fledged collision against a structure or the like, the occupant may slide and move a long distance as if thrown forward.

As described above, a further improvement in the occupant protection performance is in need in the occupant protection device.

SUMMARY OF THE INVENTION

An aspect of the present disclosure provides an occupant protection device including a knee air bag configured to be deployed rearwardly from a front of right and left knees of an occupant seated in a seat of a vehicle towards the knees to press the knees from the front. In the occupant protection device, the knee air bag includes at least either one of a right side inclined surface configured to come in contact, from a right side, with the right knee of the occupant seated in the seat and a left side inclined surface configured to come in contact with the left knee of the occupant from a left side.

DETAILED DESCRIPTION

Hereinafter, examples of the present disclosure will be described with reference to the drawings.

First Example

Figure 1A:
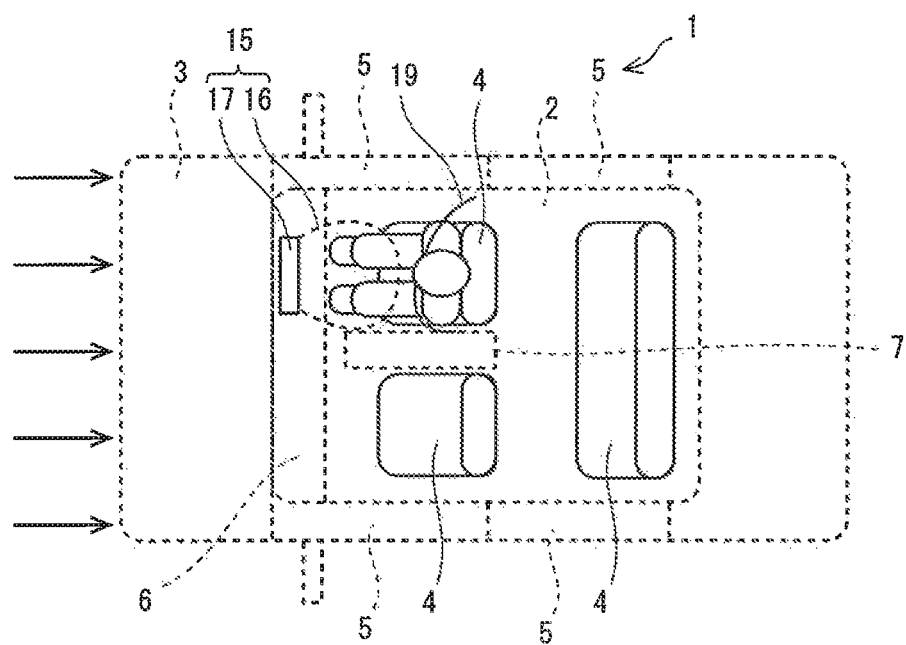
FIGS. 1A and 1B are explanatory drawings of an automobile to which an occupant protection device according to an example of the present disclosure can be applied.
Figure 1B:
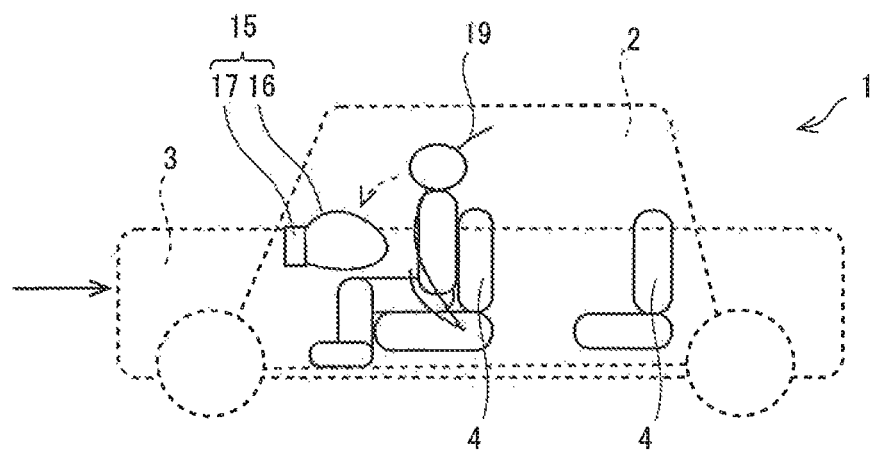

FIGS. 1A and 1B are explanatory drawings of an automobile 1 to which an occupant protection device 10 according to an example of the present disclosure can be applied.

An automobile 1 is an example of a vehicle. The automobile 1 includes a vehicle body 3 in which an occupant compartment 2 is formed. Two front seats 4 and a rear seat 4, in which occupants sit, provided facing forward in the occupant compartment 2 are provided in the occupant compartment 2. Doors 5 that are opened and closed for the occupant to get on and get off the vehicle are provided on both the left and right sides of the occupant compartment 2. A dashboard 6 having a length corresponding to the left and right width of the occupant compartment 2 is provided in front of the front seats 4. A center console 7 is provided between the two front seats 4.

Incidentally, a device that protects an occupant sitting in the seat 4 when the automobile 1 collides with another automobile is provided in the automobile 1.

A seat belt 19 and a front air bag 16 are illustrated in FIGS. 1A and 1B.

Typically, the seat belt 19 is a three-point seat belt. The three-point seat belt 19 includes a lap portion around the waist of the occupant sitting in the seat 4, and a shoulder portion crossed diagonally across the front portion of the upper body. Furthermore, a retractor (not shown) retracts the seat belt 19 to reduce the slackness of the seat belt 19 before a collision and restricts the seat belt 19 from being sent out during the collision. With the above, the seat belt 19 can be actuated to maintain the body of the occupant, which is about to move to the front from the seat 4 during a collision, in a seated state in the seat 4.

The front air bag 16 is, in the occupant compartment 2, provided in a steering wheel or the dashboard 6 provided in front of the seat 4, and is deployed rearwardly towards the seat 4. Furthermore, the deployed front air bag 16 is capable of supporting the upper body of the occupant that is collapsing forward at the time of collision and is capable of absorbing the impact.

However, the occupant is not necessarily always protected appropriately against all forms of collision even when such an occupant protection device is used. For example, even a head-on collision includes, at the least, forms of collision such as a full-lap collision, an off-set collision, and an oblique collision. Furthermore, if the forms of collision are different, the size and the direction of the impact force acting on the vehicle body 3 and the body of the occupant during collision will be different, and the behaviors of the vehicle body and the occupant will be different.

Figure 2A:
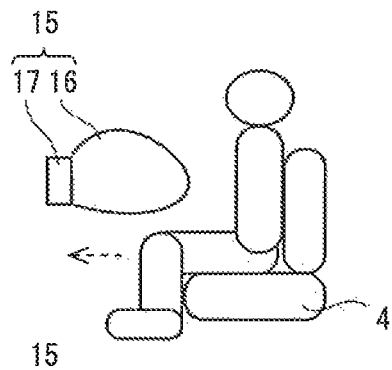
FIGS. 2A to 2C are explanatory drawings illustrating an example of a behavior of the occupant during a full-lap and head-on collision.
Figure 2B:
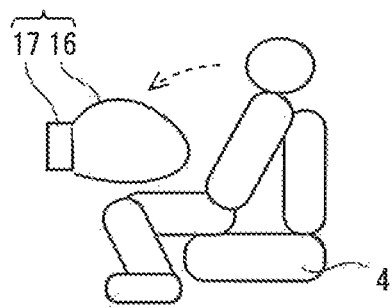
Figure 2C:
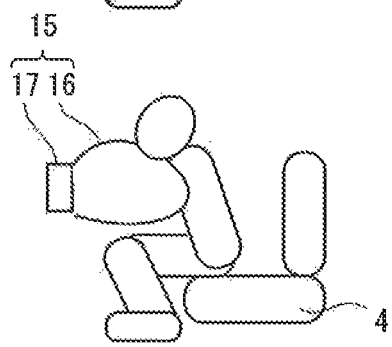

FIGS. 2A to 2C are explanatory drawings illustrating an example of a behavior of the occupant during a full-lap and head-on collision.

When a head-on collision occurs while the occupant is seated in the seat 4, as illustrated in FIG. 2A, a force relatively moving the occupant forward acts on the occupant sitting in the seat 4 due to the impact of the collision.

In such a case, if the occupant is not restrained by the seat belt 19, as illustrated in FIG. 2B, the waist of the occupant slides forward and moves from the sitting position of the seat 4.

Particularly, in a form of collision in which the vehicle is abruptly stopped by a full-fledged collision against a structure or the like, the occupant may slide and move a long distance as if thrown forward.

Subsequently, the waist of the occupant stops when reaching a state in which the knees, for example, hit a lower portion of the dashboard 6, and, as illustrated in FIG. 2C, the upper body of the occupant collapses forward from the waist, serving as an axis, at the above position.

Figure 3:
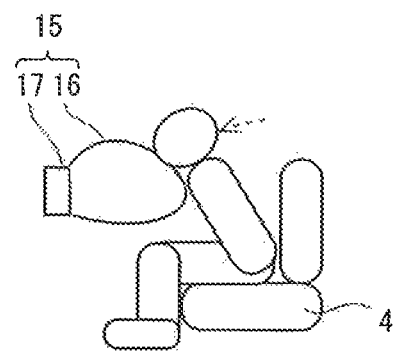
FIG. 3 is an explanatory drawing illustrating an exemplary state in which an upper body has collapsed while a waist of the occupant is, as it has been, at a sitting position of a seat.

Conversely, FIG. 3 is an explanatory drawing illustrating an exemplary state in which the upper body of the occupant has collapsed while the waist of the occupant is, as it has been, at the sitting position of the seat 4.

As it becomes apparent by making a comparison with FIG. 3, the state in which the upper body is in contact with the front air bag 16 in FIG. 2C is different from the anticipated state in FIG. 3 in which the waist is at the sitting position. The upper body of the occupant is collapsed forward at a position near the front air bag 16. The state in which the upper body is in contact with the deployed front air bag 16 is different from the anticipated state. In such a case, the deployed front air bag 16 may not be able to appropriately support the collapsed upper body and absorb the impact.

Furthermore, the upper body will be collapsing forward abruptly in a short time after the movement of the waist has stopped.

As described above, a further improvement in the occupant protection performance of the occupant protection device 10 is required.

Figure 4:
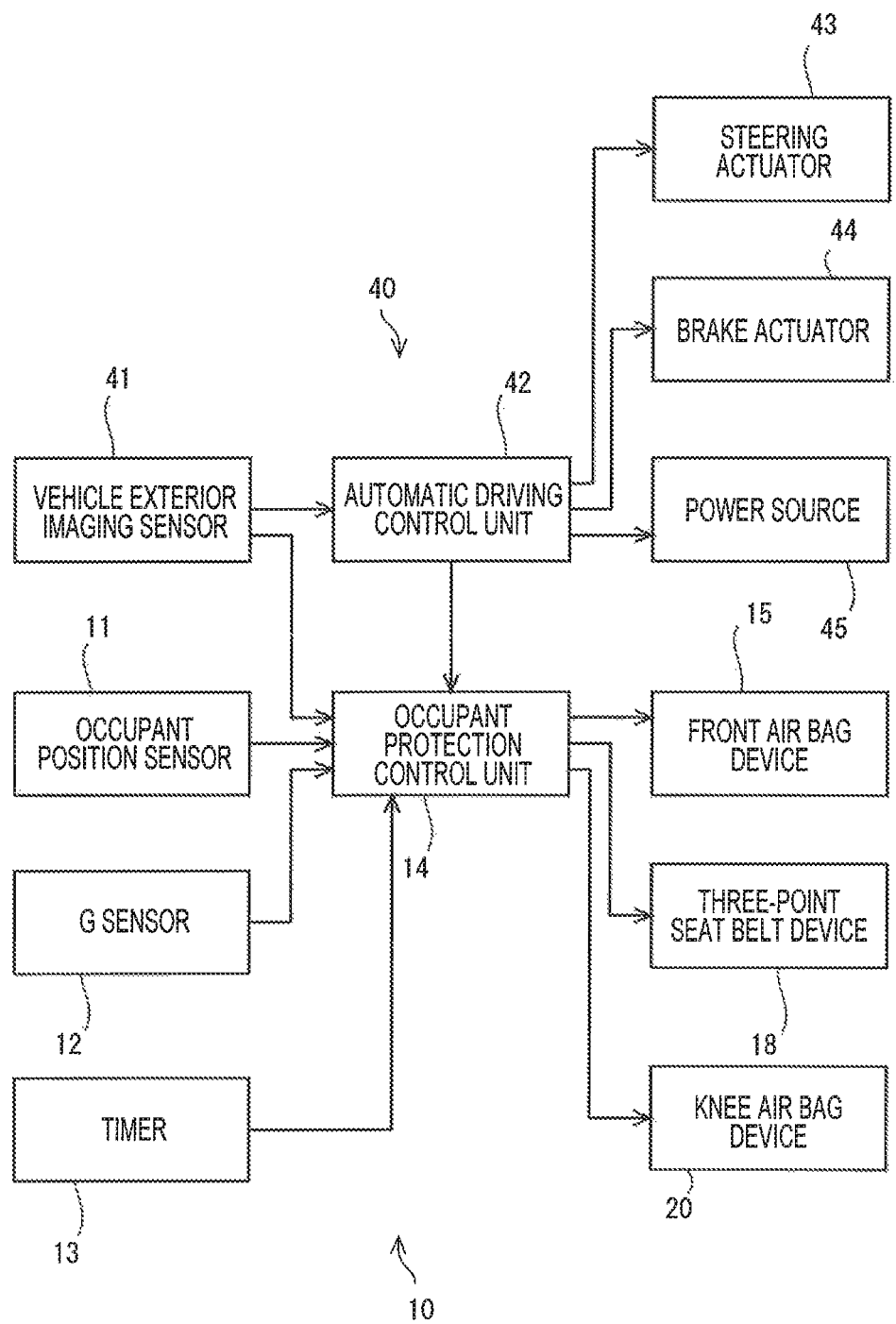
FIG. 4 is an explanatory drawing of an occupant protection device according to a first example.

FIG. 4 is an explanatory drawing of an occupant protection device 10 according to a first example.

In FIG. 4, an automatic driving control device 40 is illustrated together with the occupant protection device 10.

The automatic driving control device 40 includes a vehicle exterior imaging sensor 41, an automatic driving control unit 42, a steering actuator 43, a break actuator 44, and a power source 45.

The vehicle exterior imaging sensor 41 captures images of a portion in front of the vehicle body 3, for example. With the above, for example, other vehicle bodies that approach the moving vehicle body 3 from the front can be captured as images.

Instead of the steering wheel, the steering actuator 43 drives a steering device of the automobile 1.

Instead of the brake pedal, the break actuator 44 drives a braking device of the automobile 1.

The power source 45 is a gasoline engine or an electric motor, for example.

The automatic driving control unit 42 automatically controls the traveling of the automobile 1. The automatic driving control unit 42 controls the steering actuator 43, the break actuator 44, and the power source 45 according to information on the travel route to the destination, for example. Furthermore, the automatic driving control unit 42 identifies an approaching object on the basis of an image taken by the vehicle exterior imaging sensor 41 and estimates the collision with the approaching object. Furthermore, in a case in which a collision with an approaching object is estimated, the automatic driving control unit 42 controls the steering actuator 43, the break actuator 44, and power source 45 so as to avoid the collision.

The occupant protection device 10 in FIG. 4 includes an occupant position sensor 11, a G sensor 12, a timer 13, an occupant protection control unit 14, a front air bag device 15, a three-point seat belt device 18, and a knee air bag device 20.

The vehicle exterior imaging sensor 41, the automatic driving control unit 42, the occupant position sensor 11, the G sensor 12, the timer 13, the front air bag device 15, the three-point seat belt device 18, the knee air bag device 20 are connected to the occupant protection control unit 14.

The occupant position sensor 11 detects the position of the head or the position of the upper body of the occupant seated in the seat 4. For example, having the sitting position with the back of the body against the seat 4 as a reference, the occupant position sensor 11 detects a forward movement or a movement in the left-right direction.

The G sensor 12 detects the acceleration acting on the automobile 1. The direction of the detected acceleration may be the front-rear direction, the left-right direction, and the up-down direction.

The timer 13 measures the clock time or the time period.

The front air bag device 15 is provided in front of the occupant seated in the seat 4. The front air bag device 15 is provided in the dashboard 6 or the steering wheel, for example. The front air bag device 15 includes the front air bag 16 and an inflator 17. By input of an ignition signal, the inflator 17 discharges gas into the front air bag 16. With the above, the front air bag 16 is deployed rearwardly towards the occupant seated in the seat 4. The front air bag 16 is deployed in front of the upper body of the occupant.

The three-point seat belt device 18 includes the seat belt 19. By having a tongue (not shown) be engaged with a buckle, the seat belt 19 forms the lap portion provided around the waist of the occupant seated in the seat 4, and the shoulder portion that is crossed diagonally across the upper body, that is, from one of the shoulders to the inside of the waist. Subsequently, by input of a pretension signal and a support signal, the retractor (not shown) retracts the seat belt 19. For example, the retractor retracts the seat belt 19 to reduce the slackness of the seat belt 19 before the collision and restricts the seat belt 19 from being sent out during the collision. With the above, the seat belt 19 can maintain the body of the occupant, which is about to move to the front from the seat 4 during the collision, in the seated state in the seat 4.

Figure 5A:
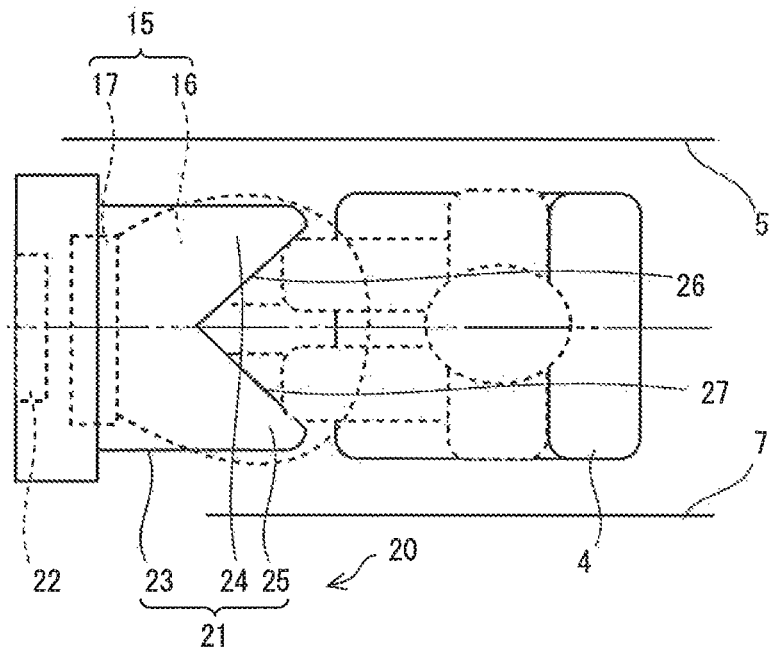
FIGS. 5A and 5B are explanatory drawings illustrating a state in which a knee air bag and the front air bag in FIG. 4 have been deployed.
Figure 5B:
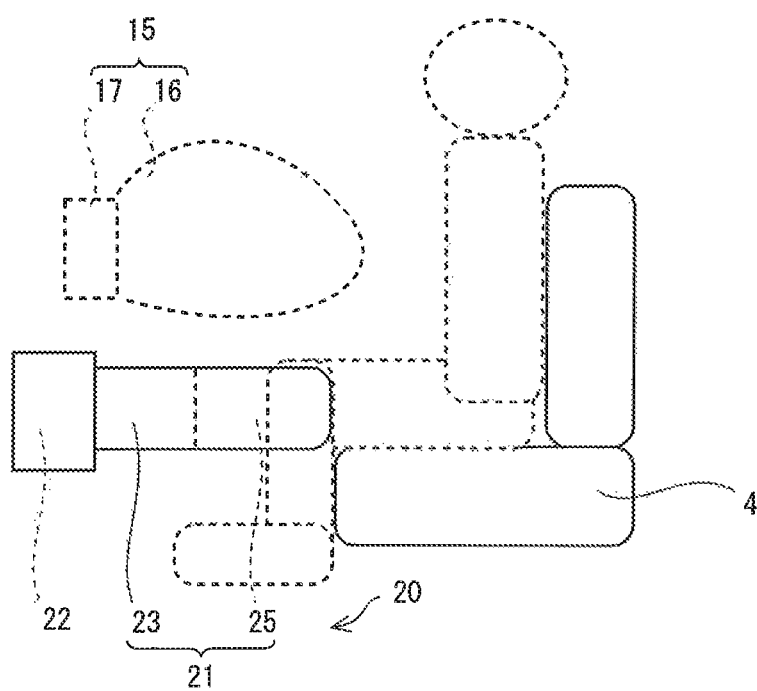

FIGS. 5A and 5B are explanatory drawings illustrating a state in which a knee air bag 21 and the front air bag 16 in FIG. 4 have been deployed. FIG. 5A is a top view and FIG. 5B is a side view viewed from the left side.

The knee air bag device 20 is provided in front of a seat surface of the seat 4. The knee air bag device 20 is, for example, provided in a lower portion of the dashboard 6 in FIG. 1, at a height that is the same as that of the seat surface of the seat 4 and in front of the middle of the seat 4 in the left-right direction. The knee air bag device 20 includes the knee air bag 21 and a front-of-knees inflator 22. Upon an input of an ignition signal, the front-of-knees inflator 22 discharges gas into the knee air bag 21 and, the knee air bag 21 is deployed rearwardly from in front of the seat 4. The deployed knee air bag 21 is deployed so as to reach a portion near the front edge of the seat 4 at the height of the seat surface of the seat 4. With the above, the knee air bag 21 is deployed towards the knees of the occupant seated in the seat 4.

The deployed knee air bag device 20 includes a basic deployed portion 23 that is deployed long in the front-rear direction with a left-right width similar to that of the seat, a right protrudedly deployed portion 24 that is deployed so as to protrude rearwardly from a right end of a rear end surface of the basic deployed portion 23, and a left protrudedly deployed portion 25 that is deployed so as to protrude rearwardly from a left end of the rear end surface of the basic deployed portion 23. Furthermore, a right side inclined surface 26 serving as an inclined surface on the center side of the seat 4 is formed in the right protrudedly deployed portion 24, and a left side inclined surface 27 serving as an inclined surface on the center side of the seat 4 is formed in the left protrudedly deployed portion 25. The right side inclined surface 26 and the left side inclined surface 27 form a V-shape that is recessed towards the front and that is symmetrical about the middle of the seat 4 in the left-right direction.

FIGS. 6A to 6D are explanatory drawings illustrating a deployment control of the air bag executed by the occupant protection control unit 14 during a collision. In FIGS. 6A to 6D, the illustration of the three-point seat belt 19 is omitted.

Figure 6A:
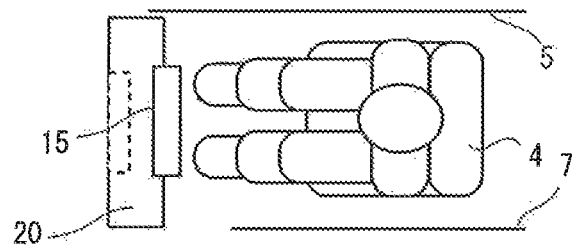
FIGS. 6A to 6D are explanatory drawings illustrating a deployment control of the air bag executed by the occupant protection control unit during a collision.

As illustrated in FIG. 6A, before the collision, the occupant is seated at the sitting position of the seat 4.

In the above state, the occupant protection control unit 14 estimates the probability of a collision on the basis of, for example, the image of a portion in front of the vehicle body 3 captured by the vehicle exterior imaging sensor 41, and traveling state information from the automatic driving control unit 42. The traveling state information includes the steering amount of the steering actuator 43, and the amount of acceleration and deceleration caused by the break actuator 44 and the power source 45. Based on the above information, the occupant protection control unit 14 determines the running route of the vehicle body 3. Furthermore, an object on or in the vicinity of the running route is identified based on the captured image of a portion in front of the vehicle body 3. Based on the above information, the occupant protection control unit 14 determines the probability of a head-on collision with the object. Note that the above determination may be executed by the automatic driving control unit 42 and the occupant protection control unit 14 may acquire the determination result from the automatic driving control unit 42.

Furthermore, in a case in which there is a possibility of a head-on collision, the occupant protection control unit 14 starts the occupant protection control.

Figure 6B:
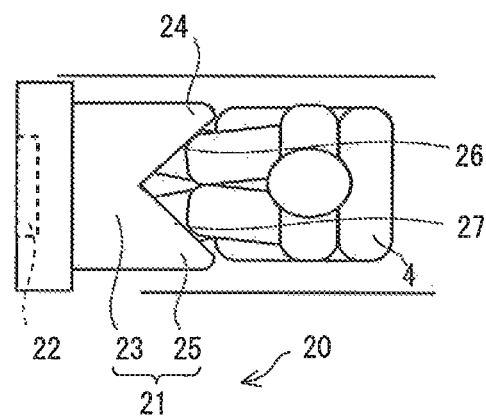

In the occupant protection control, as illustrated in FIG. 6B, the occupant protection control unit 14 first deploys the knee air bag 21. The occupant protection control unit 14 outputs an ignition signal to the front-of-knees inflator 22 of the knee air bag device 20. With the above, the knee air bag 21 starts to become deployed in the front-rear direction and is deployed towards the right knee and the left knee of the occupant seated in the seat 4. The knee air bag 21 is capable of restraining the right knee and the left knee from the front with the V shape formed by the right side inclined surface 26 and the left side inclined surface 27. By having the right knee and the left knee be supported from the front while being held between the right side inclined surface 26 and the left side inclined surface 27 of the knee air bag 21, the waist of the occupant does not easily move toward the front from the sitting position of the seat 4.

Figure 6C:
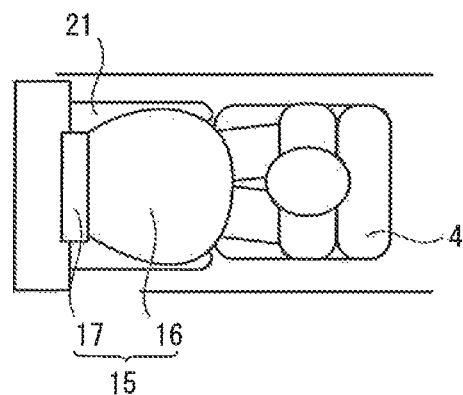

Subsequently, when an actual head-on collision is detected based on the acceleration signal of the G sensor 12, as illustrated in FIG. 6C, the occupant protection control unit 14 deploys the front air bag device 15. The occupant protection control unit 14 outputs an ignition signal to the inflator 17 of the front air bag device 15. With the above, the front air bag 16 is deployed rearwardly from the front side of the seat 4.

Figure 6D:
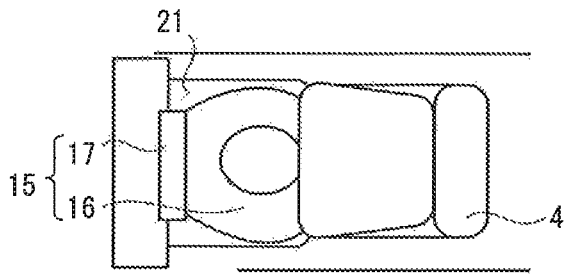

Subsequently, the upper body of the occupant collapses forward due to the input of the impact of the head-on collision. As illustrated in FIG. 6D, the upper body of the occupant collapses forward so as to rotate about the waist, serving as an axis, maintained at the sitting position of the seat 4. The state viewed from the side is similar to that of FIG. 3.

Note that the occupant protection control described above may start the deployment of the knee air bag 21 not at the timing when the possibility of the head-on collision has been determined but at the timing at which the actual head-on collision has been detected.

As described above, the present example includes the knee air bag 21 that is deployed rearwardly towards the knees from the front of the knees of the occupant seated in the seat 4 of the vehicle and that presses the knees from the front. Moreover, the knee air bag 21 includes, at portions that comes in contact with the right knee and the left knee of the occupant seated in the seat 4, the right side inclined surface 26 that comes in contact with the right outer lateral surface of the right knee and the left side inclined surface 27 that comes in contact with the left outer lateral surface of the left knee. The knee air bag 21 deployed rearwardly with a high deploying pressure from the front towards the knees comes in contact with both the left and right knees of the occupant from the front. With the above, both of the left and right knees are restrained from the front by a high deploying pressure during the collision such that forward movement is not easily made. At the time of collision, both of the left and right knees are corrected to, for example, an aligned position at the middle in the left-right direction of the seat 4 so that the occupant does not easily slide and move forward from the corrected position. Particularly, even in the form of collision in which the vehicle is abruptly stopped by a full-fledged collision against a structure or the like, the occupant will not easily slide and move a long distance as if thrown forward.

As a result, the waist of the occupant seated in the seat 4 can be prevented from sliding and moving forward at the time of collision, and the upper body of the occupant can be collapsed forward about the waist that has not slid a long distance forward. Since both left and right knees are restrained, the upper body of the occupant can be collapsed forward about the waist that is stable at the sitting position of the seat 4; accordingly, the upper body of the occupant can be collapsed in a stable and in a desired behavioral manner. Furthermore, the impact of the collapsing upper body can be absorbed in a preferable manner with the front air bag and the seat belt 19, for example. For example, even if the lap portion of the three-point seat belt 19 that supports the portion around the waist is somewhat loose before the collision, the knee air bag 21 can prevent the waist from sliding and moving forward and, moreover, the looseness of the lap portion can be removed while restraining the knees so that the waist can be supported by the seat belt 19 at the sitting position of the seat 4.

Moreover, the knee air bag 21 directly restraints both knees and does not restrain the abdominal region. On the other hand, supposedly, in a case in which the middle portion of the abdominal region of the occupant seated in the seat 4 is restrained from the front at the time of collision, for example, since the middle portion of the abdominal region is soft, it will be difficult to effectively prevent the occupant from moving forward. Moreover, when the restraining force becomes strong, a force that restraints the abdominal region directly and intensely acts thereon. The knee air bag 21 is capable of restraining from the front with a firm strength so that the waist of the occupant does not slide and move forward.

In the present example, the right side inclined surface 26 and the left side inclined surface 27 are formed in a symmetrical manner about a line extending along the center of the seat 4 in the left-right direction. With the above, both the left and right knees of the occupant facing forward and seated along the centerline of the seat 4 can be restrained from both the left and right sides such that the left and right knees are each on the corresponding one of the two sides of the centerline of the seat 4.

In the present example, the knee air bag 21 is deployed along the center of the seat 4 in the left-right direction. Accordingly, the lower extremity of the occupant can be aligned to extend along the center of the seat 4 in the left-right direction, for example.

In the present example, the knee air bag 21 is deployed at a height of the seat surface of the seat. Accordingly, a high deploying pressure oriented rearwardly at the height of the seat surface of the seat can act on both the left and right knees; accordingly, the lower extremity of the occupant seated in the seat 4 can be made to not easily move forward.

Second Example

The occupant protection device 10 according to a second example will be described next. In the following description, points that are different from the first example will be mainly described and description that overlaps the description of the first example will be omitted.

Figure 7:
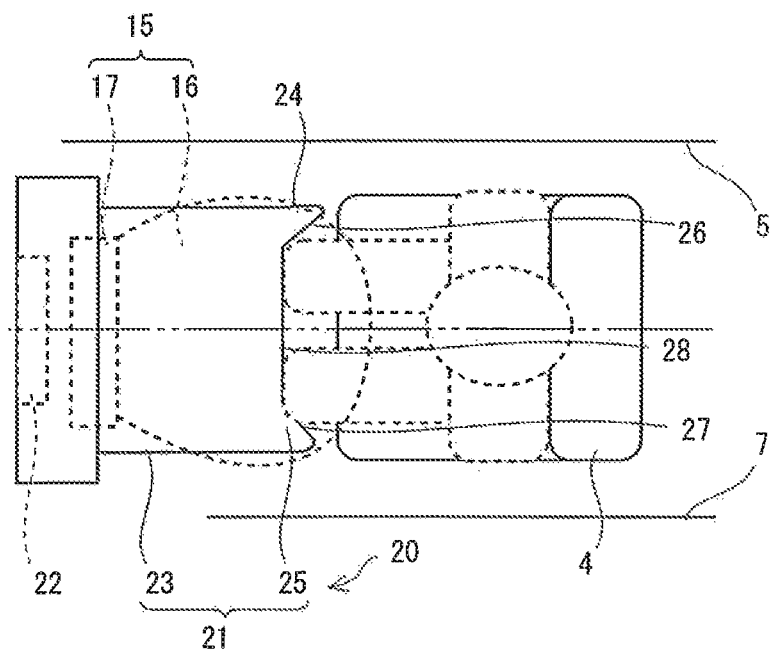
FIG. 7 is an explanatory drawing of an occupant protection device according to a second example.

FIG. 7 is an explanatory drawing of the occupant protection device 10 according to the second example.

The knee air bag 21 includes an anterior knee contact surface 28 between the right side inclined surface 26 and the left side inclined surface 27. The anterior knee contact surface 28 is provided so as to extend in the left-right direction and comes in contact with the right knee and the left knee from the front.

Furthermore, the right side inclined surface 26 is formed so as to be inclined at an obtuse angle with respect to the anterior knee contact surface 28. The left side inclined surface 27 is formed so as to be inclined at an obtuse angle with respect to the anterior knee contact surface 28. The right side inclined surface 26 and the left side inclined surface 27 are formed in a symmetrical manner about the middle of the seat 4 in the left-right direction.

As described above, in the present example, the knee air bag 21 includes the anterior knee contact surface 28 that is provided so as to extend in the left-right direction between the right side inclined surface 26 and left side inclined surface 27 and that comes in contact with the right and left knees from the front. Accordingly, the loads of both knees acting on the anterior knee contact surface 28 deform the anterior knee contact surface 28, which extends in the left-right direction, in a recessed manner, and with the above, the right side inclined surface 26 and the left side inclined surface 27 function so as to close the right and left knees from both the left and right sides. With the above, both left and right knees can be closed more firmly, and the left and right knees can be supported so as not to move forward while being pushed and closed towards each other.

Third Example

The occupant protection device 10 according to a third example will be described next. In the following description, points that are different from the first example will be mainly described and description that overlaps the description of the first example will be omitted.

Figure 8:
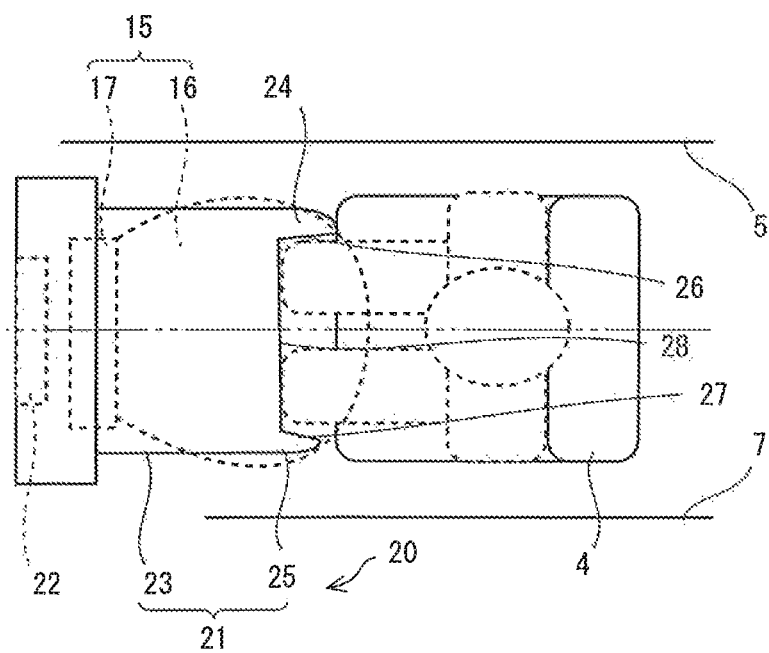
FIG. 8 is an explanatory drawing of an occupant protection device according to a third example.

FIG. 8 is an explanatory drawing of the occupant protection device according to the third example.

In FIG. 8, the right side inclined surface 26 and the left side inclined surface 27 are formed so as to be inclined at different angles with respect to the anterior knee contact surface 28. Specifically, the angle formed between the right side inclined surface 26 and the anterior knee contact surface 28 is an obtuse angle that is smaller than the angle formed between the left side inclined surface 27 and the anterior knee contact surface 28.

Furthermore, the right side inclined surface 26 is formed longer than the left side inclined surface 27 in the front-rear direction, and is formed with a larger area.

As described above, the right side inclined surface 26 and the left side inclined surface 27 are formed in an asymmetrical manner about the middle of the seat 4 in the left-right direction.

As described above, in the present example, the right side inclined surface 26 and the left side inclined surface 27 are formed in an asymmetrical manner about a line extending along the center of the seat 4 in the left-right direction. Particularly, since the angle formed between the right side inclined surface 26 and the anterior knee contact surface 28 is an obtuse angle that is smaller than the angle formed between the left side inclined surface 27 and the anterior knee contact surface 28, and since the area of the right side inclined surface 26 is larger than the area of the left side inclined surface 27, the right knee is more unlikely to move pass the outside of the right side inclined surface 26. As described above, by having the contact surface on the door side have a larger area than the contact surface on the opposite side and have an obtuse angle that is smaller in the left-right direction, the ability of restraining the knee on the door side from the outside becomes relatively higher and the knee can be suppressed from shifting out of place to the door side.

Fourth Example

The occupant protection device 10 according to a fourth example will be described next. In the following description, points that are different from the first example will be mainly described and description that overlaps the description of the first example will be omitted.

Figure 9A:
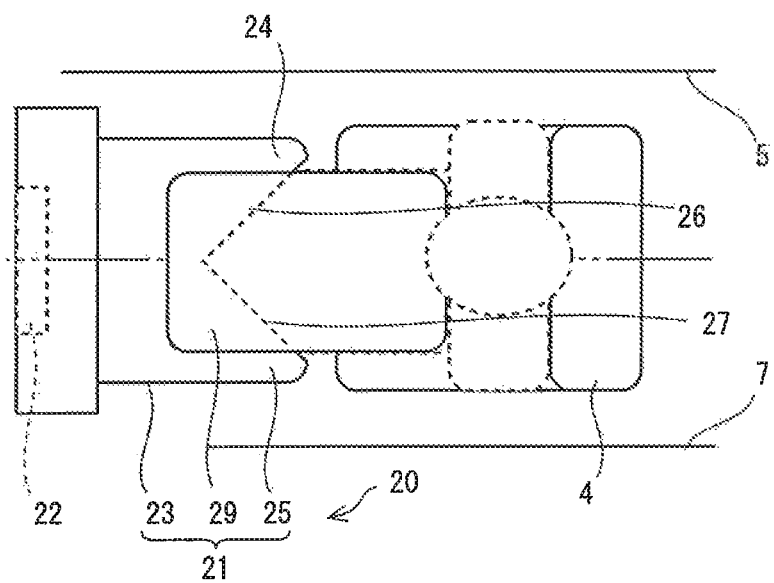
FIGS. 9A and 9B are explanatory drawings of an occupant protection device according to a fourth example.
Figure 9B:
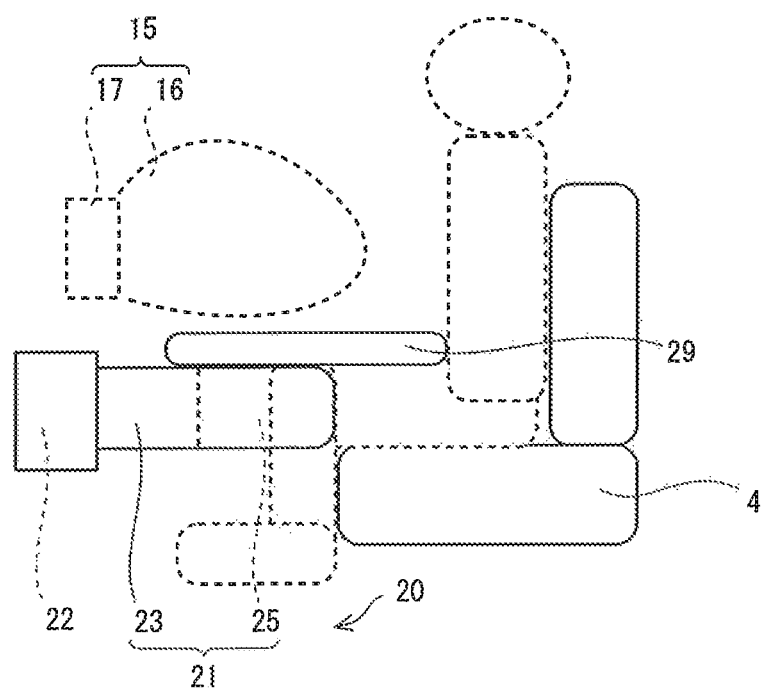

FIGS. 9A and 9B are explanatory drawings of the occupant protection device 10 according to the fourth example. FIG. 9A is a top view and FIG. 9B is a side view viewed from the left side.

In FIGS. 9A and 9B, the knee air bag 21 includes a rearwardly deployed portion 29 that is deployed rearwardly from the basic deployed portion 23 and that abuts against the waist of the occupant seated in the seat 4.

As described above, in the present example, the right protrudedly deployed portion 24 and the left protrudedly deployed portion 25 are deployed so as to protrude rearwardly from both left and right ends of the rear end surface of the basic deployed portion 23. With the above, the right side inclined surface 26 and the left side inclined surface 27 can be formed.

Furthermore, the present example includes the rearwardly deployed portion 29 that is deployed rearwardly from the basic deployed portion 23 and that abuts against the waist of the occupant seated in the seat 4. Accordingly, the waist is restrained together with both the left and right knees of the occupant, such that forward movement of the occupant can be suppressed even more.

The examples above are preferable examples of the present disclosure; however, the present disclosure is not limited by the examples and may be modified and changed in various ways within the scope of the disclosure.

For example, in the examples described above, the knee air bag 21 includes the right side inclined surface 26 and the left side inclined surface 27 that face each other, and the left and right knees are held between the right side inclined surface 26 and the left side inclined surface 27 when the knee air bag 21 is deployed rearwardly. With the above, both left and right knees can be aligned at the middle of the seat 4 in the left-right direction, and the waist can be restrained effectively so that the waist does not easily slide and move during a front collision.

Other than the above, for example, the knee air bag 21 may include only the right side inclined surface 26, and may push the right knee of the occupant seated in the seat to the left from the right side. With the above, the knees can be pressed from the front while both left and right knees are aligned with respect to each other.

The invention claimed is:

1. An occupant protection device comprising:
   a knee air bag configured to be deployed rearwardly from a front of right and left knees of an occupant seated in a seat of a vehicle towards the knees to press the knees from the front,
   wherein the knee air bag comprises a right side inclined surface configured to come in contact, from a right side, with the right knee of the occupant seated in the seat and a left side inclined surface configured to come in contact with the left knee of the occupant from a left side, and wherein the knee air bag comprises
      a basic deployed portion configured to be deployed in a front-rear direction and to have a width corresponding to a width of the seat,
      a right protrudedly deployed portion configured to be deployed so as to protrude rearwardly from a right end of a rear end surface of the basic deployed portion to form the right side inclined surface,
      a left protrudedly deployed portion configured to be deployed so as to protrude rearwardly from a left end of the rear end surface of the basic deployed portion to form the left side inclined surface, and
      a rearwardly deployed portion configured to be deployed rearwardly from the basic deployed portion to abut against a waist of the occupant seated in the seat.

2. The occupant protection device according to claim 1, wherein the right side inclined surface and the left side inclined surface are configured to face each other, and
wherein the right side inclined surface and the left side inclined surface are configured to hold the right knee and the left knee in between when the knee air bag is deployed rearwardly.

3. The occupant protection device according to claim 2, wherein the knee air bag further comprises an anterior knee contact surface provided so as to extend in a left-right direction between the right side inclined surface and the left side inclined surface, the anterior knee contact surface configured to come in contact with the right knee and the left knee from the front.

4. The occupant protection device according to claim 3, wherein the right side inclined surface and the left side inclined surface are formed in an asymmetrical manner with respect to each other.

5. The occupant protection device according to claim 4, wherein the knee air bag is configured to be deployed along a middle of the seat in a left-right direction.

6. The occupant protection device according to claim 4, wherein a contact surface of either of the right side inclined surface and the left side inclined surface that is on a vehicle door side has an area that is larger than an area of a contact surface on an opposite side, or has an obtuse angle in the left-right direction that is smaller than an angle in the left-right direction of the contact surface on the opposite side.

7. The occupant protection device according to claim 6, wherein the knee air bag is configured to be deployed along a middle of the seat in a left-right direction.

8. The occupant protection device according to claim 6, wherein the knee air bag is configured to be deployed at a height of a seat surface of the seat.

9. The occupant protection device according to claim 1, wherein the knee air bag is configured to be deployed along a middle of the seat in a left-right direction.

10. The occupant protection device according to claim 1, wherein the knee air bag is configured to be deployed at a height of a seat surface of the seat.

11. The occupant protection device according to claim 1, wherein the right side inclined surface and the left side inclined surface are formed in an asymmetrical manner with respect to each other.

12. The occupant protection device according to claim 2, wherein the knee air bag is configured to be deployed along a middle of the seat in a left-right direction.

13. The occupant protection device according to claim 2, wherein the knee air bag is configured to be deployed at a height of a seat surface of the seat.

14. The occupant protection device according to claim 3, wherein the knee air bag is configured to be deployed along a middle of the seat in a left-right direction.

15. The occupant protection device according to claim 3, wherein the knee air bag is configured to be deployed at a height of a seat surface of the seat.

16. The occupant protection device according to claim 3, wherein the right side inclined surface and the left side inclined surface are formed in a symmetrical manner with respect to each other.

17. The occupant protection device according to claim 4, wherein the knee air bag is configured to be deployed at a height of a seat surface of the seat.

18. An occupant protection device comprising:
a knee air bag configured to be deployed rearwardly from a front of right and left knees of an occupant seated in a seat of a vehicle towards the knees to press the knees from the front,
wherein the knee air bag comprises a right side inclined surface configured to come in contact, from a right side, with the right knee of the occupant seated in the seat and a left side inclined surface configured to come in contact with the left knee of the occupant from a left side,
wherein the knee air bag further comprises the right side inclined surface and the left side inclined surface that are configured to face each other,
wherein the right side inclined surface and the left side inclined surface are configured to hold the right knee and the left knee in between when the knee air bag is deployed rearwardly
wherein the knee air bag further comprises an anterior knee contact surface provided so as to extend in a left-right direction between the right side inclined surface and the left side inclined surface, the anterior knee contact surface configured to come in contact with the right knee and the left knee from the front, and
wherein the right side inclined surface and the left side inclined surface are formed in an asymmetrical manner with respect to each other, wherein a contact surface of either of the right side inclined surface and the left side inclined surface that is on a vehicle door side has an area that is larger than an area of a contact surface on an opposite side, or has an obtuse angle in the left-right direction that is smaller than an angle in the left-right direction of the contact surface on the opposite side.

19. The occupant protection device according to claim 18, wherein the knee air bag comprises
a basic deployed portion configured to be deployed in a front-rear direction and to have a width corresponding to a width of the seat,
a right protrudedly deployed portion configured to be deployed so as to protrude rearwardly from a right end of a rear end surface of the basic deployed portion to form the right side inclined surface,
a left protrudedly deployed portion configured to be deployed so as to protrude rearwardly from a left end of the rear end surface of the basic deployed portion to form the left side inclined surface, and
a rearwardly deployed portion configured to be deployed rearwardly from the basic deployed portion to abut against a waist of the occupant seated in the seat.

20. The occupant protection device according to claim 18, wherein the knee air bag is configured to be deployed at a height of a seat surface of the seat.

* * * * *